UNITED STATES PATENT OFFICE.

ANDRÉ PÉNISSAT, OF CLERMONT-FERRAND, FRANCE, ASSIGNOR TO HIMSELF AND WILLIAM H. NICHOLS, OF BROOKLYN, NEW YORK.

IMPROVEMENT IN PROCESSES FOR RECOVERING WASTE SULPHURIC ACID.

Specification forming part of Letters Patent No. 204,244, dated May 28, 1878; application filed March 7, 1878.

*To all whom it may concern:*

Be it known that I, ANDRÉ PÉNISSAT, of Clermont-Ferrand, in France, have invented an Improvement in Recovering Sulphuric Acid from the Refuse in the Treatment of Coal-Oil, of which the following is a specification:

In the treatment of coal-oil it is usual to mix sulphuric acid to cause the deposit of tarry or carbonaceous materials, and these become refuse that is of little or no value; and heretofore such refuse has not been treated for the recovery of the sulphuric acid, except in a very crude manner, and in places where the production of sulphuric acid by the ordinary process has been attended with unusual expense.

My improved process is as follows: I mix with the refuse material sufficient water to cause a separation of the acid from the tar. The latter rises to the surface, and is skimmed off and again washed in water, and the water from this second washing is used for washing other refuse or residuum, so as to remove almost all of the acid.

The diluted acid is placed in leaden pans and concentrated to about 60° or 61° Baumé, and in so doing the acid is not evaporated. Any suitable pans, either open or covered, may be employed for this purpose; but covered are preferable, to prevent any odors passing into the atmosphere.

The concentrated material, is by preference, run into a tank, to allow the carbonaceous material held in suspension, or a portion thereof, to subside. There still remains mixed with the acid some carbon that renders the acid blackish; but there is no tar. I next boil the acid in a suitable still, such as the platinum basin of Faure and Kessler, and the result of the condensation of the vapors is the production of white sulphuric acid of a strength varying from 10° to 50° Baumé.

The result of the boiling is the evaporation of sulphuric acid, which is condensed, and the sulphurous gases that may be evolved are conducted to a chamber, and converted into sulphuric acid in the manner usual in sulphuric-acid works.

Provision is to be made for the introduction of water into the platinum basin, if required, in order to prevent injury to the apparatus should the acid become too strong. Furthermore, the acid to be concentrated is to be supplied continuously, or nearly so, to the platinum basin, and a pipe is also provided as an overflow from the platinum basin, so that the refuse, or a portion of the contents of the still, can be run off in case the carbon becomes in excess or the still becomes too full. By observing the drips from the still the character of the acid in it can be determined, and by keeping the still sufficiently full to produce a slight overflow the attendant prevents risk of injury to the still.

The acid produced in this manner is very pure. The presence of carbon in the platinum or other still is not injurious, as it either decomposes the sulphuric acid and goes off as carbonic acid or carbonic oxide, or is washed out, as before mentioned.

The operation of distillation, condensation, and conversion is continuous; hence I am able to use a small still, and heat the same to the necessary temperature to produce the results aforesaid.

The white acid produced in the aforesaid continuous distillation is weak, and the same requires to be concentrated in lead pans and platinum or other known concentrating-stills.

I am aware that the refuse sulphuric acid in the treatment of petroleum has been mixed with water, agitated, the oil drawn off, the acid concentrated, water again added to cause some of the impurities to subside, and the acid has been drawn off and concentrated.

In this case the acid is still of a dark color. There is not and cannot be a continuous distillation or concentration of the acid, and the concentrating-vessel has to be large enough to hold the concentrated acid, and the same has to be emptied at the completion of every charge.

By my process I do not concentrate, but I employ a continuous distillation, that is destructive to the carbonaceous material, the acid being distilled in the form of vapor, and condensed, and the carbon that is present being converted into gases in the presence of the acid, and these gases are condensed in the usual manner in sulphuric-acid works, so as to avoid any loss, and allow for the use of a small still, and prevent the expense of the numerous concentrations inseparable from the methods of recovery heretofore resorted to, and the product is a pure white acid, instead of the dark-colored acid heretofore produced.

I claim as my invention—

The method herein specified of recovering sulphuric acid from the refuse in the treatment of coal-oil, consisting in washing the acid from the tar, evaporating the proper portion of the water, and then vaporizing the said acid by a continuous operation in a platinum or other suitable pan, condensing and producing the white sulphuric acid, and then concentrating the same, substantially as set forth.

Signed by me this 4th day of March, 1878.

ANDRÉ PÉNISSAT.

Witnesses:
 GEO. W. PINCKNEY,
 WILLIAM G. MOTT.